United States Patent [19]

Purser

[11] 4,037,100

[45] July 19, 1977

[54] ULTRA-SENSITIVE SPECTROMETER FOR MAKING MASS AND ELEMENTAL ANALYSES

[75] Inventor: Kenneth H. Purser, Manchester, Mass.

[73] Assignee: General Ionex Corporation, Ipswioh, Mass.

[21] Appl. No.: 662,968

[22] Filed: Mar. 1, 1976

[51] Int. Cl.[2] .................. B01D 59/44; G01K 1/08; H01J 23/00

[52] U.S. Cl. .................. 250/281; 250/282; 250/398; 328/233

[58] Field of Search .................. 250/398, 281, 282; 328/233

[56] References Cited

U.S. PATENT DOCUMENTS 3,786,359 1/1974 King .................. 328/233

*Primary Examiner*—Alfred E. Smith

*Assistant Examiner*—T. N. Grigsby

*Attorney, Agent, or Firm*—Russell & Nields

[57] ABSTRACT

The present invention comprehends an extremely sensitive apparatus which can be used for the detection of electronegative particles and provide data as to their elemental composition. A mass spectrometer selects negative ions of the required mass coming from an ion source. These ions are then directed into a dissociator which fragments complex molecules and strips electrons from the resulting products producing positively charged ions. These positively charged ions are filtered by a series of elements which independently measure some combination of the quantities: energy/charge, energy, momentum/charge, velocity, charge. Such measurement allows the actual mass of each particle to be uniquely defined and, if necessary, over-determined for reduction of backgrounds.

4 Claims, 2 Drawing Figures

ULTRA-SENSITIVE SPECTROMETER FOR MAKING MASS AND ELEMENTAL ANALYSES

BACKGROUND OF THE INVENTION

During the past few years the fields of health studies, semiconductor manufacture and environmental protection have presented increasingly stringent demands on the designers of analysis instruments for higher sensitivities during trace analyses. An urgent example is the current need to analyze the stratosphere for fluorocarbons and their derivatives. The reason for the urgency is that Freon 11 and Freon 12, which have been developed and valued largely because of their useful chemical properties, apparently are not destroyed in the lower atmosphere by chemical reactions but slowly diffuse upwards into the upper atmosphere. Upon reaching the stratosphere it is believed that these compounds are decomposed by ultraviolet radiation from the sun, with the resulting release of free chlorine atoms. It is thought that these free chlorine atoms then may act to decrease gradually the average concentration of ozone by means of catalytic chain reactions.

The principal reason why fluorocarbon releases to the atmosphere are considered to be of such potential importance is that a reduction in average long-term concentration of ozone would result in an increase in the amount of ultraviolet radiations reaching the earth's surface. This increase in ultraviolet radiation is postulated to increase skin cancer and it is feared that the growth and development of certain plant and animal species might also be altered.

The problem with fluorocarbons is of sufficient concern that unless new scientific evidence is found to remove the cause for concern it would seem necessary to restrict use of Freon 11 and Freon 12 to the replacement of fluids in existing refrigeration systems. All other uses for these fluorocarbons would be banned. The impact of such restrictions, which have been proposed to start in 1978, can be estimated from the fact that there were at least 2 billion pounds of these fluorocarbons produced in 1973 and it is estimated that a million workers would be affected by restrictions upon fluorocarbon use.

It is clear that direct measurement of chlorine and chlorine oxide are urgently needed. However, the problems are severe because calculations indicate that stratospheric chlorine will be found in concentrations of $3 \times 10^{-13}$ to $3 \times 10^{-12}$ concentration by volume ($10^5$ to $10^6$ molecules per ambient $cm^3$) and chlorine oxide in concentrations of $3 \times 10^{-11}$ ($10^7$ molecules per ambient $cm^3$) at 30 kilometers height. The present invention describes an apparatus that could be used for Cl and F measurements in the concentrations described. It would be valuable in measuring small concentrations of any electronegative atom, molecule or radical.

Devices are presently commercially available for the efficient conversion of electronegative particles into a well controlled high velocity stream of negative ions. One such device is manufactured by General Ionex of Ipswich, Mass. By directing the emerging particles in a stream such that each passes successively through a small mass analyzer, a charge exchange dissociater, an appropriate arrangement of electric and magnetic fields and finally into an energy sensitive detector, it is possible to over-determine the kinetic parameters of each particle and provide a real time unique identification.

Because these procedures virtually eliminate molecular contributions and other scatter backgrounds, sensitivities for Cl greater than $1/10^4$ by volume can be achieved.

Also there are many similarities between the principles of the present invention and those underlying the design of nuclear research accelerators of the tandem type. High voltage particle accelerators using charge transfer processes are described in U.S. Pat. No. 3,353,107 and elsewhere. Because of these similarities there exists a wealth of directly applicable design experience and theoretical information which can be applied to the present invention.

SUMMARY OF THE INVENTION

The present invention comprehends a new type of ultra-sensitive spectrometer for making mass and elemental analyses, and a method for using said spectrometer. The gas to be analyzed is passed into a high efficiency negative ion source which produces negative ions that are mass analyzed in a moderate resolution spectrometer. The particles leaving the spectrometer are accompanied by a variety of other background particles such as hydrocarbon fractions having a mass equal to that selected by the spectrometer. They will also be accompanied by sundry scattered particles from within the apparatus itself. All these particles, wanted and unwanted, are now accelerated and injected into a dissociator which breaks large molecules into their component elements. These fragments are also charge exchanged in the dissociator to a positive charge state. The charged fragments are now operated on by a variety of electric and magnetic fields making it possible to identify each particle that arrives at the detector with a unique combination of velocity, charge state, momentum and energy which must be consistent with the known accelerating and deflecting fields. The system is designed so that the kinetic parameters of each particle are over determined making it possible to eliminate completely particles which are scattered either from the gas or from the surfaces, as well as hydrocarbon fractions.

DETAILED DESCRIPTION

Figure 1:
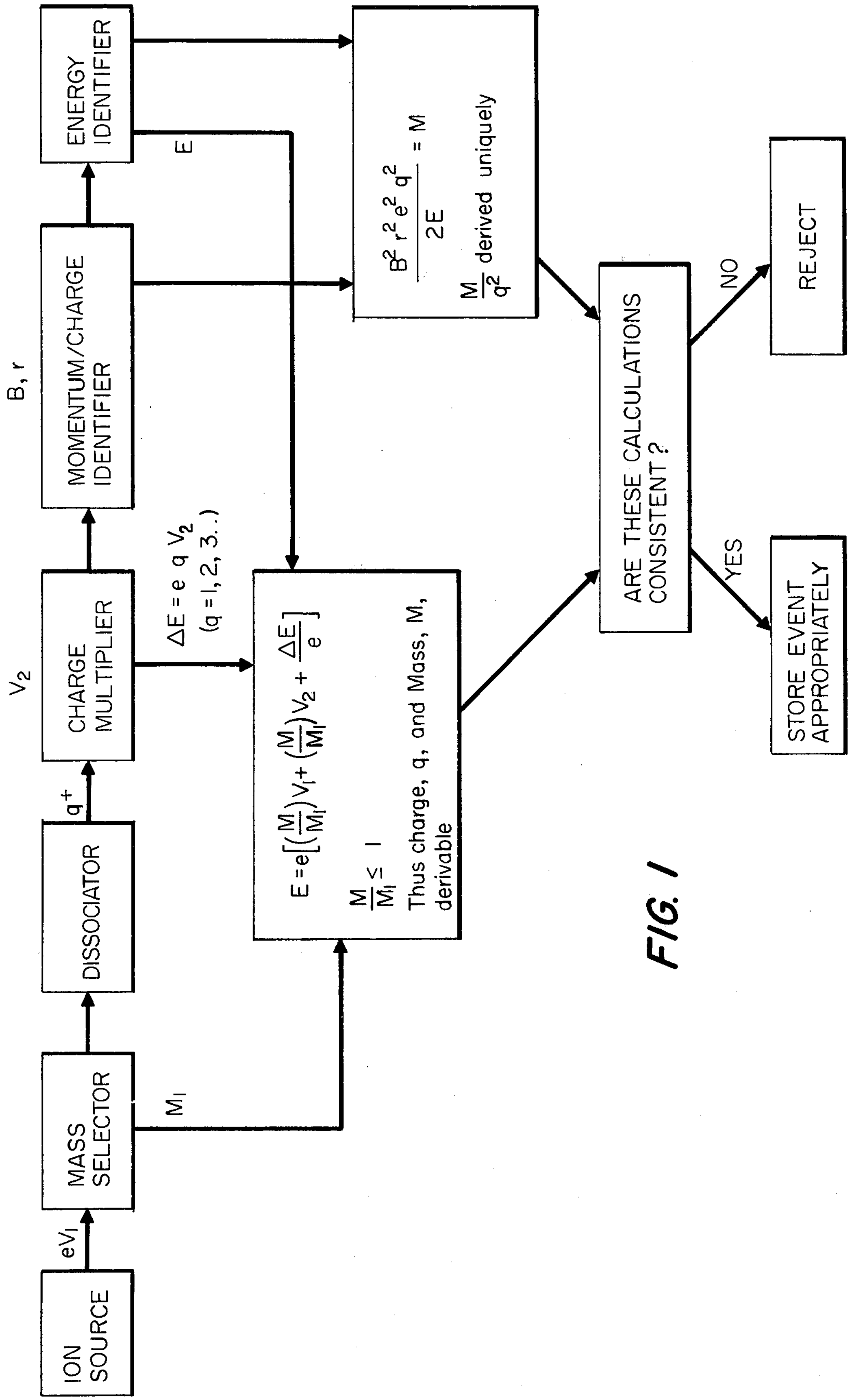
FIG. 1 is a schematic diagram of the apparatus of the present invention.

The present invention can best be understood with reference to the accompanying drawing. The schematic diagram in FIG. 1 shows the particles and component arrangement of one embodiment of a basic electronegative particle analyzer incorporating the principles of the invention. My invention also comprehends alternative embodiments. For example, weight limitations and other factors may well dictate that in lieu of the conventional magnetic deflection shown in FIG. 1, the apparatus which identifies the high-velocity particles at ground level may include for example, a combination of a velocity filter, a radio-frequency mass filter, or an electrostatic deflector.

Figure 2:
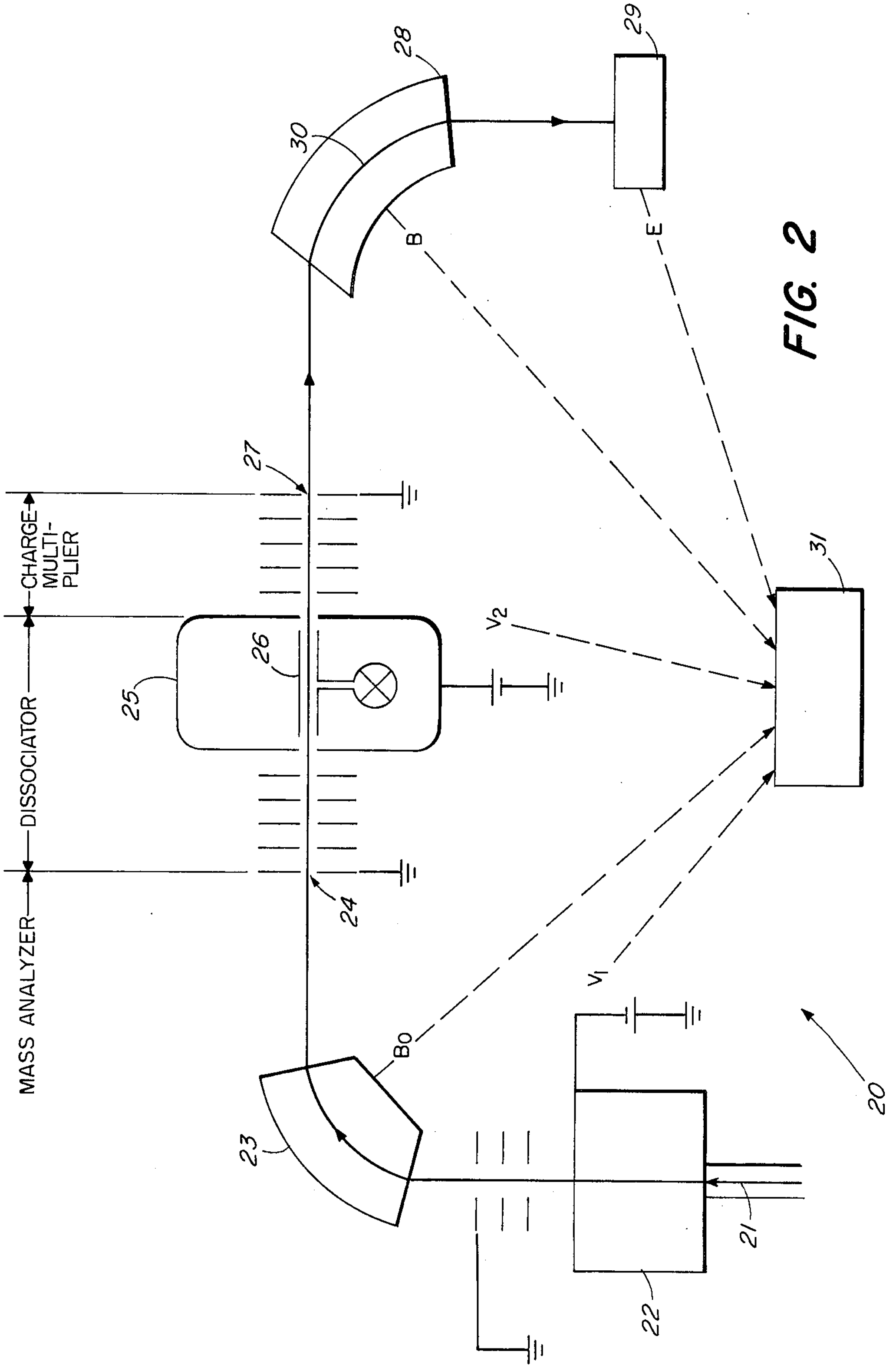
FIG. 2 is a diagrammatic view of one embodiment of the apparatus of the present invention.

A preferred embodiment of the apparatus 20 of the present invention is shown diagrammatically in FIG. 2. In the first stage of the proposed analysis apparatus, a continuous flow of the gas 21 to be analyzed would be passed into the conversion region of an efficient negative ion generator 22 at the rate equivalent to a few atm. cc/hr. This ion generator 22 is at a potential of $V_1$. It would be constructed along lines similar to those used in a reliable and proven ion source that is presently marketed by General Ionex under the tradename HICONEX, the principles of which have been described by myself in Purser, K. H., *IEEE Transactions on Nuclear Science,* vol. 20, p. 136 (1973). Measurements indicate that this device converts approximately 3% of the chlorine atoms in the incoming gas sample into a well defined beam of Cl ions having a particle energy of approximately 20 keV and an emittance less than 3 mrad.cm.MeV ½. The high efficiency of this device is related to the physical fact that the electronegative atoms leaving a cesiated surface with an energy of a few electron-volts have a high probability of being in a negative charge state. Ion sources based on this fact have become reliable tools for the nuclear physicist and frequently operate for hundreds of hours with little or no attention between vacuum openings. The ion source 22 could equally well be a duoplasmatron, similar to that described by Lawrence and McKibben, or it could be some other conventional type of negative ion source such as a radio frequency source or *Philips-Ion-Guage* (PIG) discharge source. Alternatively, within the scope of this invention the negative ion source 22 used could be based upon a scanning cesium beam which would raster the surface of the material to produce negative ions and hence produce an analysis of the surface on a point by point basis.

After leaving the ion source 22, the particles are selected on the basis of mass. The particles are mass-analyzed in a conventional manner, such as via a mass analysis magnet 23. This step of the analysis process consists of accelerating the ions to an energy of few keV followed by a deflection in an appropriate magnetic field of magnetic induction $B_o$. The mass resolution of this part of the apparatus need not be high by conventional mass spectrometer standards. For example, in experiments where the concentration of atomic Cl is to be measured a low resolution mass selector 23 would be set at 35 or 37; in those experiments where a measurement of ClO is needed the mass selector 23 would be set at 51 or 53. While ions of other mass will be strongly rejected, it is inevitable that some background particles will leave the mass selector 23. These backgrounds will come from molecular fragments, from negative particles that have been scattered in from the walls or from the residual gas and from neutral or positive particles that have been charge-exchanged in the residual gas. It is these backgrounds which must be eliminated by the dissociator 25 and filter sections that follow.

Upon leaving the mass selector (i.e., the mass analysis magnet 23) the particles are injected through a defining aperture 24 into the dissociator and stripper section 25 of the apparatus 20. The principle of the dissociator 25 is that selected particles are accelerated to an energy of the order of 1 MeV using the potential $V_2$ of the dissociator 25, after which the particles pass through a thin target 26. Such thin targets are well known in the art of tandem accelerators and are generally defined as a target through which the particles in the beam passing therethrough lose an amount of kinetic energy which is small compared to their kinetic energy. Such a target may comprise a thin foil or, as shown in FIG. 2, a gas canal. Ideally, the accelerating potential $V_2$ should be of sufficient magnitude that the particles reach a velocity high compared to that of the valency electrons. Under these conditions outer electrons tend to be stripped from the ions and rotational and vibrational bands are excited in molecules. Each of these processes can lead to a high probability that molecules will dissociate and atoms such as Cl will assume a positive charge state of 2+ or 3+. This process is an extremely effective rejector of molecular background fragments. It is difficult to visualize a process where the initial mass selected particles (M−) can lose four electrons to become $M^{3+}$ without coulomb disruption of the original molecule. Apart from this simple coulomb argument any vibrational or rotational excitation of the molecule that is introduced during the dissociation process will tend to make the molecules even more unstable. It is interesting to note that because the dissociation and charge exchange is carried out at energies that are high compared to the binding energies, the transverse momentum introduced during dissociation is small and the individual particles leave the dissociator with their momentum virtually unchanged. Consequently, the particles can be efficiently collected by succeeding sections of the apparatus 20. This fact tends to make the particle losses in these devices small.

During the dissociation and charge exchange process described above the fragments become positively charged to a value of qe (*e* is the electronic charge and *q* is a small positive integer). They are further accelerated by a second passage through $V_2$ and emerge at 27 with a final kinetic energy that is given by the equation:

$$E = e\,[V_2(q + M/M_1) + V_1(M/M_1)] \qquad (1)$$

where $M_1$ is the particle mass before the stripping canal 25 and $M$ is the particle mass after the stripping canal 25. Because $M/M_1 \leq 1$ and $V_1 << V_2$ the energy is dominated by $q$. In other words, the charge number $q$ acts as a multiple of the accelerating voltage $V_2$.

The energy of the wanted particles at this point is of the order of a few MeV. It should be noted, however, that because the charge state of the ion is a small positive integer, there are only a few discrete energies that particles can have for specified $V_2$ and $V_1$ if they have travelled the full distance from the ion source through the accelerating potentials, and $q$ is uniquely identifiable because $M/M_1 \leq 1$.

In the apparatus 20 shown in FIG. 2 the particles are now magnetically deflected by a magnetic bending element 28 and directed into an energy sensitive detector 29 such as a proportional counter, surface barrier detector, or scintillation detector. This detector 29 would be calibrated to provide an output signal proportional to the energy, $E$, of the detected particle. Upon magnetic deflection particles must satisfy a second equation:

$$Br = \sqrt{2\,ME}/q\,e \qquad (2)$$

Here, $r$ is the radius of curvature and $B$ is the magnetic induction along the path of the central ray 30.

While it is not essential to the execution of this invention, it would be advantageous if the energy sensitive detector 29 described in the previous paragraph were of the type to provide also positional information. Such information gives the arrival location of the event in space as well as time and makes it possible to record several lines simultaneously and assist with background substraction.

If we consider equations (1) and (2) together, the only two quantities that are not specified by measurable physical quantities are the final charge state of the ion $q$ and the mass M. Thus, the event is completely determined with $q$ and M calculated by a miniprocessor 31. As mentioned earlier, the charge state must be a small positive integer 1, 2, 3 . . . , and M must satisfy the conservation law of being less than $M_1$. Thus, each event can be checked in real time for internal consistency and only those with the correct mass recorded.

The system as described in the previous paragraphs is extremely efficient. The transmission between the exit slit of the first spectrometer 23 and the dissociator region 25 can be close to 100% efficient. Because of the high momentum of the particles, the fragments at the dissociation 25 are all directed into a small forward cone allowing them to be collected by the filtering section with an efficiency that is also close to 100%. Because $q$ can take on a small range of values, the particles leaving the dissociator will be distributed among several charge states and some loss of intensity is expected (for the numbers proposed the efficiency of this stage would be at least 20%). Overall, the system will be highly efficient and it is expected that for strongly electronegative particle species such as fluorine, chlorine and sulphate ions, there will be between 0.1% and 1% efficiency between the gas which enters the ion source and the particles which reach the final detector.

As a further refinement of this invention, it is possible to include further filtering elements such as a velocity filter. A velocity filter, consists of electric and magnetic fields arranged at right angles. In its simplest form it will transmit particles with a velocity, given by:

$$v = E_1/B_1 \qquad (3)$$

where $E_1$ is the electric field in the filter and $B_1$ is the magnetic field in the filter.

If a velocity selector is included the ratio of the fields would be set to the value given by:

$$E_1/B_1 = \sqrt{2E/M}$$

Such a filter could be turned off until the apparatus was tuned. On being energized it would eliminate all particles which did not have the correct velocity without attenuating the wanted particles.

Having thus described the principles of the invention, together with several illustrative embodiments thereof, it is to be understood that, although specific terms are employed, thay are used in a generic and descriptive sense and not for purposes of limitation, the scope of the invention being set forth in the following claims.

I claim:

1. An ultra-sensitive spectrometer for mass and elemental analysis comprising in combination:

a thin target, means for directing a focussed beam of charged particles of the material to be analyzed through said thin target, whereby said particles are dissociated into positively charged components, means for accelerating said components comprising a substantially constant electric field, whereby said components acquire additional kinetic energy the quantity of which depends upon their charge, and means for filtering, detecting and measuring kinematic characteristics of said components.

2. A spectrometer according to claim 1 wherein said means for directing a focussed beam comprises a source of negative ions of the material to be analyzed and means for analyzing said negative ions into a focussed beam of particles of known mass.

3. A method for mass and elemental analysis comprising the following steps:

forming a charged beam of moderate and known energy of particles to be analyzed, subjecting said particles to mass analysis, accelerating the analyzed particles to a high voltage terminal of known voltage, stripping electrons from at least some of the particles to form positive ions of various integral multiples of the fundamental electronic charge, accelerating said positive ions through said voltage and filtering detecting and measuring kinematic characteristics of said accelerated positive ions.

4. A method according to claim 3 in which at least some of said particles are dissociated into fragment particles.

* * * * *

UNITED STATES PATENT AND TRADEMARK OFFICE

CERTIFICATE OF CORRECTION

PATENT NO. : 4,037,100

DATED : July 19, 1977

INVENTOR(S) : Kenneth H. Purser

It is certified that error appears in the above-identified patent and that said Letters Patent are hereby corrected as shown below:

Column 2, line 3 "$1/10^4$" should be corrected to read --$1/10^{14}$--.

Signed and Sealed this

*Twenty-fifth* Day of *October 1977*

[SEAL]

*Attest:*

RUTH C. MASON
*Attesting Officer*

LUTRELLE F. PARKER
*Acting Commissioner of Patents and Trademarks*